July 26, 1960     A. F. YODER     2,946,092
APPARATUS FOR ROTATIONALLY DISTRIBUTING
A LIQUID CHARGE WITHIN A MOLD
Filed Aug. 4, 1958     2 Sheets-Sheet 1
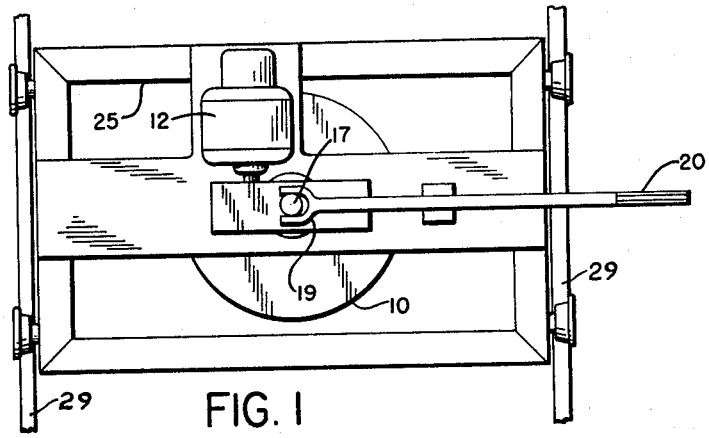
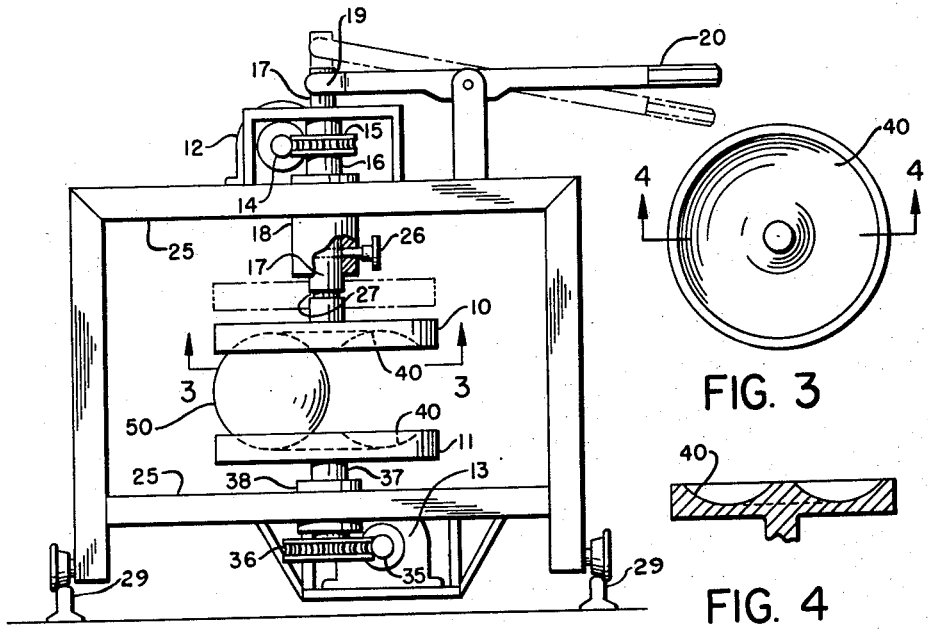
*INVENTOR.*
ALFRED F. YODER
BY *Ely, Pearne &*
*Gordon*
ATTORNEYS July 26, 1960 A. F. YODER 2,946,092
APPARATUS FOR ROTATIONALLY DISTRIBUTING
A LIQUID CHARGE WITHIN A MOLD
Filed Aug. 4, 1958 2 Sheets-Sheet 2

INVENTOR.
ALFRED F. YODER
BY
ATTORNEYS

United States Patent Office 2,946,092
Patented July 26, 1960

2,946,092

APPARATUS FOR ROTATIONALLY DISTRIBUTING A LIQUID CHARGE WITHIN A MOLD

Alfred F. Yoder, Sandusky, Ohio, assignor to The Barr Rubber Products Company, Sandusky, Ohio, a corporation of Ohio Filed Aug. 4, 1958, Ser. No. 752,932

8 Claims. (Cl. 18—26)

The present invention relates to apparatus for the manufacture of hollow articles from plastic materials by what may be termed the rotational casting process. In this type of molding operation, a hollow mold is loaded with a charge of plastic material, most conveniently in liquid or semi-liquid form, and the mold is rotated upon itself in a plurality of planes so that the material distributes itself over the interior of the mold or matrix and gels on the interior of the matrix in such distributed condition. The gelled skin or shell is then fused, usually by heat, to finally form the molded article. In the practice of this type of molding operation, various types of plastic materials or resins may be employed. At the present time, it is the common practice to employ vinyl resins which are polymers of vinyl chloride combined with suitable plasticizers, but it will be understood that other materials suitable for the purposes may be employed in the illustrated invention, including cold-setting materials. With such materials, heating and cooling of the molds may be entirely omitted.

The purpose of the present invention is to provide a machine for production of articles by the rotational casting process which is more simple and more versatile than those of the prior art. Machines of the prior art are generally limited to one or several particular, albeit complex, motions to effect the distribution of the charge. The present invention makes possible the provision of an infinite range of different complex motions, and changeover from one to the other or continuous change throughout the range or a portion thereof may be effected while the apparatus is operating, if desired.

Machines with the same general objectives as those of the present invention have been suggested in the prior art but those which have proven satisfactory in use are relatively complex and costly. Moreover, even with their complexity they are not adapted to ready changeover from one complex motion to another either during operation or during shutdown. They are incapable of adjustment through an infinite range of different complex motions.

While one particular machine embodying the invention is illustrated in order that the invention may be readily understood, some of the details of the illustrated machine are not necessary to the invention and changes, modifications, and improvements may be adapted without departing from the general scope of the invention as defined in the appended claims.

In the accompanying drawings:

Figure 1 is a plan view of a machine embodying the invention.

Figure 2 is a side elevation of the machine shown in Figure 1.

Figure 3 is a view taken from the plane of line 3—3 in Figure 2.

Figure 4 is a cross-section taken from the plane of line 4—4 in Figure 3.

Figure 5:
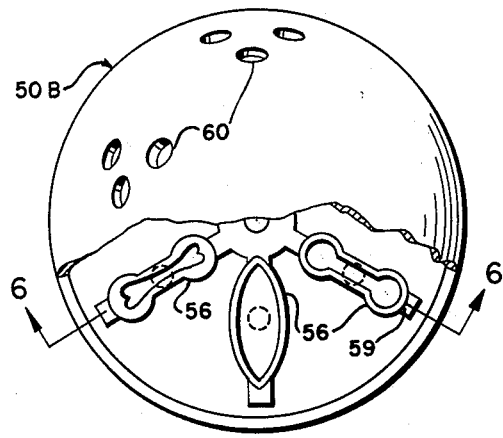
Figure 5 illustrates a spherical member including mold means which may be employed according to the invention.

As shown in Figures 1 and 2, the illustrated apparatus comprises a pair of facing drive plates 10 and 11 having a common axis. Means for rotating the drive plates at different speeds are provided in the form of variable speed motors 12 and 13.

The motor 12 acting through the gears 14 and 15 drives a sleeve 16 which, through a spline connection (not seen), drives an inner shaft 17 to which is affixed the drive plate 10. The upper end of the shaft 17 is engaged by a yoke 19 which is raised and lowered by manipulation of the handle or cam follower 20. The sleeve 16 is rotatably supported in a pillow block or bearing 18 which is affixed to the frame 25. The arrangement is such that the drive plate 10 may be driven by the motor 12 independently of its vertical positioning. The drive plate 10 may be temporarily held in its raised position by the releasable detent pin 26 which is adapted to be received in the shaft slot 27.

Through the gears 35 and 36, the lower motor 12 drives the shaft 37 to which is affixed the lower drive plate 11. The shaft 37 is rotatably supported in the bearing or pillow block 38, which is fixed to the frame 25.

Each of the drive plates 10 and 11 is provided with an annular trough 40. Adapted to be received between the facing drive plates 10 and 11 and within the annular troughs 40 is a spherical member 50 which includes mold means as later described herein.

When the spherical member 50 is drivenly engaged between the facing drive plates 10 and 11 which are rotated at different speeds, the spherical member 50 is rotated around a constantly changing major axis, as well as around the common axis of the drive plates 10 and 11. The complex motion can be varied through an infinite range by changing the relative speeds between the drive plates 10 and 11. In some situations, it may be desirable to maintain one drive plate stationary. It may even be desired to rotate the drive plates 10 and 11 in opposite directions. In each of these cases, however, it will be understood that the drive plates are rotated at different speeds with respect to their common axis which is vertical to the faces of the drive plates.

The motors 12 and 13 are preferably variable speed motors although the invention may be practiced in some of its aspects if the motors 12 and 13 are constant speed motors operating at the same speed, so long as the gear ratios through gears 14 and 15 on the one hand and 35 and 36 on the other hand are different, as illustrated.

The concave surfaces of the annular troughs 40 may have a greater, equal or smaller radius than that of the spherical member 50. The annular troughs 40 or the spherical member 50 or both may be coated with suitable coatings of plastic or elastomeric materials if desired to increase or decrease the drive friction.

Figure 7:
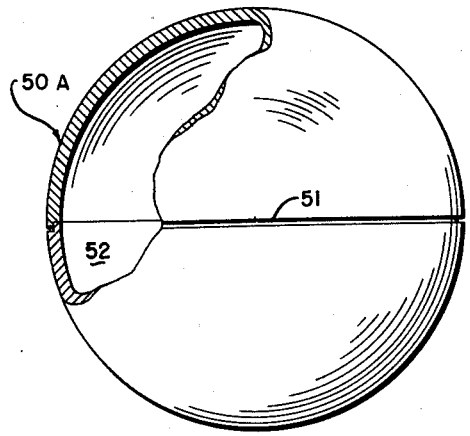
Figure 7 illustrates another spherical member including mold means which may be employed according to the invention.

The spherical member 50 may include mold means in the simple manner illustrated in Figure 7 where the spherical exterior 50A bounds a single wall or shell, the interior surface of which forms the interior of a simple sectional mold in the form of a ball, the mold parting line being indicated by the reference numeral 51. It will be understood that a liquid or semi-liquid charge placed within the mold cavity 52 will be distributed thereabouts when the mold is drivenly engaged between the drive plates 10 and 11 as previously described.

Figure 6:
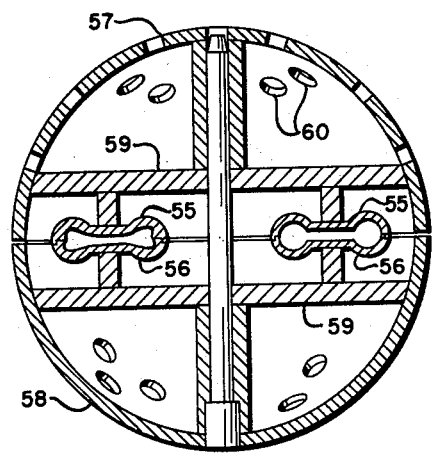
Figure 6 is a cross-sectional view taken on the planes of line 6—6 in Figure 5.

The spherical member 50 may include mold means of a more complex nature as illustrated in Figures 5 and 6. Here the spherical shell 50B does not constitute in itself the walls of a mold but rather it contains mold sections for a plurality of different individual molds associated with each of the two exterior sections of the spherical member 50B. Thus, there are provided the mold sections 55 and the mold sections 56 associated with the hemispheres 57 and 58, respectively, and which form the individual molds 55, 56 upon assembly of the hemispheres 57 and 58. The sections making up the individual molds 55, 56 may be supported within the spherical shell 50B by appropriate spider structures indicated generally by the reference numeral 59. If the rotational casting process involves a heating step, it is important to provide small or large openings in the spherical member, such as the openings 60, or to construct the spherical member as a cage comprising a plurality of narrowly or widely spaced bars or straps with large openings therebetween.

The illustrated annular troughs 40 comprise merely shallow grooves. However it should be apparent that other equivalent means such as concentric rails or rods defining between them an annular spherical-member-receiving trough may be employed, and all such equivalents are to be understood as included in the term "troughs" as used in the appended claims.

The drive plates 10 and 11 in the above description comprise solid discs. However it will be understood that other equivalent rotatable structure may be employed. For example, drive plates made of wire mesh may be employed. Rails or rods welded or otherwise fabricated into assemblies mechanically equivalent to the solid drive plates 10 and 11 may be employed. All such equivalents are to be understood as included in the term "drive plates" as used in the appended claims.

When gelling and/or fusing of the charge is to be accomplished by the application of heat, the spherical members 50 may be suitably preheated and they may be passed through heated zones during their complex casting motion. To this end the exemplifying apparatus is illustrated as mounted for translation along rails 29 which lead through a heating chamber or the like.

The above description of the invention should make it apparent that many details of the apparatus embodying the invention may be varied without departing from the teaching of the invention. Accordingly, the scope of the invention is not to be limited to precise details of the specifically described embodiments but is to be defined by the following claims.

What is claimed is:

1. Apparatus for distributing a liquid charge in a mold comprising a pair of facing drive plates, means for rotating said drive plates at different speeds with reference to a common axis vertical to the faces of said drive plates, a spherical member drivenly engageable between said drive plates, and mold means included within said spherical member whereby a liquid charge within said mold means will be distributed in the mold means by the motion about a plurality of axes caused by the rotation of said drive plates at different speeds.

2. Apparatus for distributing a liquid charge in a mold comprising a pair of drive plates having opposed faces, each face including an annular trough, means for rotating said drive plates at different speeds with reference to a common axis vertical to said opposed faces, a spherical member drivenly engageable between said drive plates and guided in each of said annular troughs, and mold means included within said spherical member.

3. Apparatus for distributing a liquid charge in a mold comprising a pair of facing drive plates, means for rotating said drive plates at different speeds with reference to a common axis vertical to the faces of said drive plates, a sectional spherical member drivenly engageable between said drive plates, and sectional mold means included within said spherical member whereby a liquid charge within said mold means will be distributed in the mold means by the motion about a plurality of axes caused by the rotation of said drive plates at different speeds.

4. Apparatus for distributing a liquid charge in a mold comprising a pair of drive plates having opposed faces, each face including an annular trough, means for rotating said drive plates at different speeds with reference to a common axis vertical to said opposed faces, a sectional spherical member drivenly engageable between said drive plates and guided in each of said annular troughs, and sectional mold means included within said spherical member.

5. Apparatus for distributing a liquid charge in a mold comprising a pair of facing drive plates, means for rotating said drive plates at different speeds with reference to a common axis vertical to the faces of said drive plates, a spherical member having two sphere sections and drivenly engageable between said drive plates, and sectional mold means included within said spherical member, said sectional mold means comprising mold sections for a plurality of individual molds associated with each of said two sphere sections, said mold sections forming said plurality of individual molds upon assembly of said two sphere sections, said two sphere sections having openings therein opening from the interior to the exterior thereof.

6. Apparatus for distributing a liquid charge in a mold comprising a pair of drive plates having opposed faces, each face including an annular trough, means for rotating said drive plates at different speeds with reference to a common axis vertical to said opposed faces, a spherical member having two sphere sections and drivenly engageable between said drive plates and guided in each of said annular troughs, and sectional mold means included within said spherical member, said sectional mold means comprising mold sections for a plurality of individual molds associated with each of said two sphere sections, said mold sections forming said plurality of individual molds upon assembly of said two sphere sections, said two sphere sections having openings therein opening from the interior to the exterior thereof.

7. Apparatus for distributing a liquid charge in a mold comprising a pair of facing drive plates, means for rotating said drive plates at different speeds with refrence to a common axis vertical to the faces of said drive plates, a spherical member having at least two sphere sections and drivenly engageable between said drive plates, and sectional mold means included within said spherical member, said sectional mold means comprising mold sections for a plurality of different individual molds associated with each of said at least two sphere sections, said mold sections forming said plurality of individual molds upon assembly of said at least two sphere sections, said at least two sphere sections having openings therein opening from the interior to the exterior thereof.

8. Apparatus for distributing a liquid charge in a mold comprising a pair of drive plates having opposed faces, each face including an annular trough, means for rotating said drive plates at different speeds with reference to a common axis vertical to said opposed faces, a spherical member having at least two sphere sections and drivenly engageable between said drive plates and guided in each of said annular troughs, and sectional mold means included within said spherical member, said sectional mold means comprising mold sections for a plurality of individual molds associated with each of said at least two sphere sections, said mold means forming said plurality of closed individual molds upon assembly of said at least two sphere sections, said at least two sphere sections having openings therein opening from the interior to the exterior thereof.

References Cited in the file of this patent

UNITED STATES PATENTS

| | | |
|---|---|---|
| 48,022 | Lovegrove | May 30, 1865 |
| 2,194,028 | Miller | Mar. 19, 1940 |
| 2,859,151 | Usab et al. | Nov. 4, 1958 |